United States Patent

[11] 3,543,867

| [72] | Inventors | Alfred Sigmund Smemo<br>Durango;<br>Larry James Glider, Dubuque, Iowa |
|---|---|---|
| [21] | Appl. No. | 727,297 |
| [22] | Filed | May 7, 1968 |
| [45] | Patented | Dec. 1, 1970 |
| [73] | Assignee | Deere & Company<br>Moline, Illinois<br>a corporation of Delaware |

[54] TRASH EMITTING DEVICE FOR TRACTOR-MOUNTED BLADE
10 Claims, 3 Drawing Figs.

| [52] | U.S. Cl. | 172/801, 172/764 |
|---|---|---|
| [51] | Int. Cl. | E02f 3/76 |
| [50] | Field of Search | 37/(S.A.), 141, 118(A); 172/801—809 |

[56] References Cited
UNITED STATES PATENTS

| 1,550,780 | 8/1925 | Cerasoli | 172/801 |
|---|---|---|---|
| 2,198,147 | 4/1940 | Austin | 172/805 |
| 2,341,853 | 2/1944 | Austin | 172/809 |
| 2,485,407 | 10/1949 | Peterson | 172/803 |
| 3,424,251 | 1/1969 | Bouley | 172/801 |

FOREIGN PATENTS

| 744,489 | 2/1956 | Great Britain | 172/801 |
|---|---|---|---|
| 940,335 | 10/1963 | Great Britain | 37/118(A) |

*Primary Examiner*—Robert E. Pulfrey
*Assistant Examiner*—Alan E. Kopecki
*Attorneys*—H. Vincent Harsha, Harold M. Knoth, William A. Murray and John C. Nolan ABSTRACT: A pair of upright structural elements disposed alongside opposite sides of a tractor and extending from the upper edge of a blade upwardly and rearwardly to close the gap between the upper edge of the blade and the forward end of the tractor.

Patented Dec. 1, 1970

INVENTORS
ALFRED S. SMEMO &
LARRY J. GLIDER
BY William A. Murray
ATTORNEY

3,543,867

TRASH EMITTING DEVICE FOR TRACTOR-MOUNTED BLADE

BACKGROUND OF THE INVENTION

This invention relates to a tractor-mounted blade in which the blade is carried on a pair of vertically movable arms forwardly of the tractor. Still more particularly, this invention relates to a structure that extends from the upper edge of the blade upwardly and rearwardly to opposite sides of the tractor so as to prevent trash, logs, and other foreign matter of sizable quantity from entering into the gap between the arms and the underside of the tractor and the gap between the rear surface of the blade and the forward end of the tractor.

One of the more conventional-type implements used in forestry is an articulated tractor with a winch or grapple unit mounted on a rear frame that pulls fallen trees or logs. The forward frame of the articulated tractor has a forwardly mounted blade carried on vertically swingable arms. When used in the forest, the blade moves trash, large stones, logs, fallen trees and other material that lies in the path of the tractor. The lift arms for the blade are normally positioned on opposite sides of the tractor and when the lift arms are in their lower positions, there is a vertical gap between the upper edges of the arms and the underside of the tractor. Also, the blade on the arms is positioned forwardly of the tractor and normally when the blade is in its lower position, there is a gap between the forward end of the tractor and the upper edge of the blade. Consequently, large items may move over the edge of the blade and be trapped between the upper edges of the arm and the underside of the tractor. If the operator is unaware of a condition in which a large item is trapped in such a location, he may operate the hydraulic cylinders to lift the arms. The hydraulic cylinders for lifting the arms are often above the arms and disposed in this area. This often causes damage to the arms, the cylinders or the tractor body. Also, the more stringy type of trash that moves over the blades will eventually accumulate in the area between the arms and the underside of the tractor and eventually an operator may be forced to clean the area of the trash.

SUMMARY OF THE INVENTION

It is therefore the primary object of the present invention to provide a pair of trash emitting structures that are fixed to the blade and extends upwardly and rearwardly from the upper edge of the blade to opposite sides of the tractor. Each of the structures has an inclined edge that extends upwardly beyond the forward end of the tractor. Consequently, as trash is caused to move over the blade and onto these edges, there will be a natural tendency for them to slide downwardly and forwardly along the edges. Should a large quantity of trash be accumulated on these edges, merely backing the tractor will leave most of the trash on the ground.

DESCRIPTION OF THE PREFERRED EMBODIMENT

Figure 1:
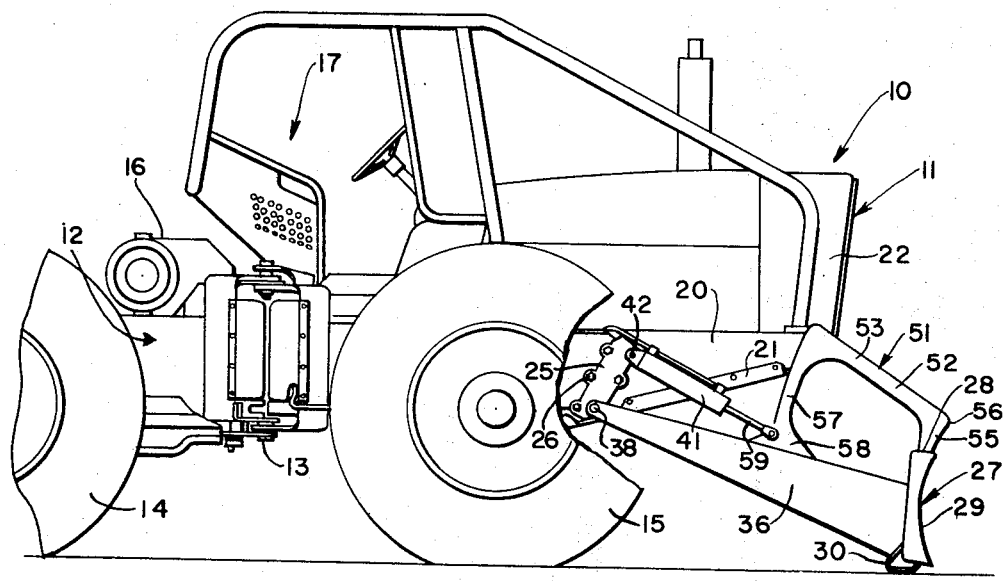
FIG. 1 is a side view of a tractor and a tractor-mounted blade using the structure of the present invention. Portions of the tractor are removed for purposes of clearly showing the structure of the invention.
Figure 2:
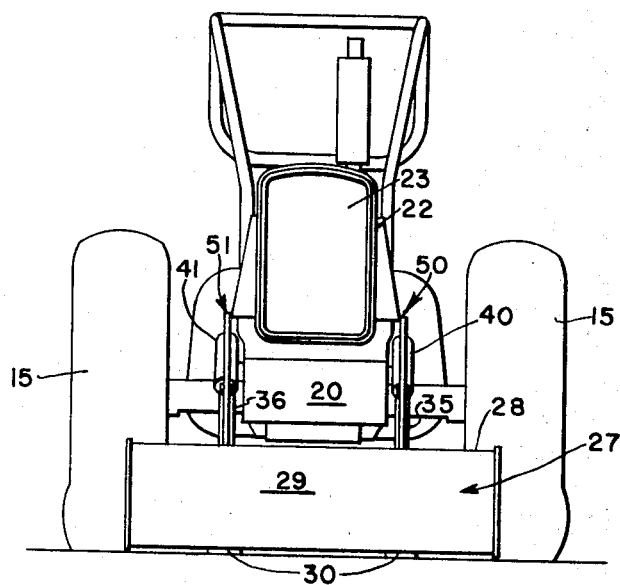
FIG. 2 is a front view of the structure shown in FIG. 1.

The present invention relates to a tractor-implement combination in which the tractor 10 is of an articulated-type having a front body portion 11 and a rear frame portion 12 hingedly joined to one another at a vertical pivot 13 to permit relative lateral movement. The rear frame 12 carries a winch structure 16 for pulling or otherwise handling trees. An operator's station, indicated in its entirety by the reference numeral 17, is cantilevered from the front body portion 11 rearwardly over the pivot structure 13. Such a tractor is conventional and well known in the field and consequently is described only for purposes of orientation.

The front body portion 11 has left- and right-hand sides spaced inwardly from the respective traction wheels 15. The body 11 is supported on a large U-shaped frame 20 that extends around the under portion of the tractor body 11. Lower fore-and-aft extending edges of the frame 20 may be considered as the underside of the tractor body 11. Guard plates 21 are provided on the outer lower edges of the frame 20. The tractor body 11 has a front end composed of an upright rectangular-shaped sheet steel frame 22 supported on the U-shaped frame 20 and having suitable and heavily reinforced grillwork 23 so as to protect parts behind the grillwork 23 from damage. Conventionally, a tractor used in the forest is constructed so that the frame 22 and the grillwork 23 are capable of withstanding rather heavy and shock loads against them.

Figure 3:
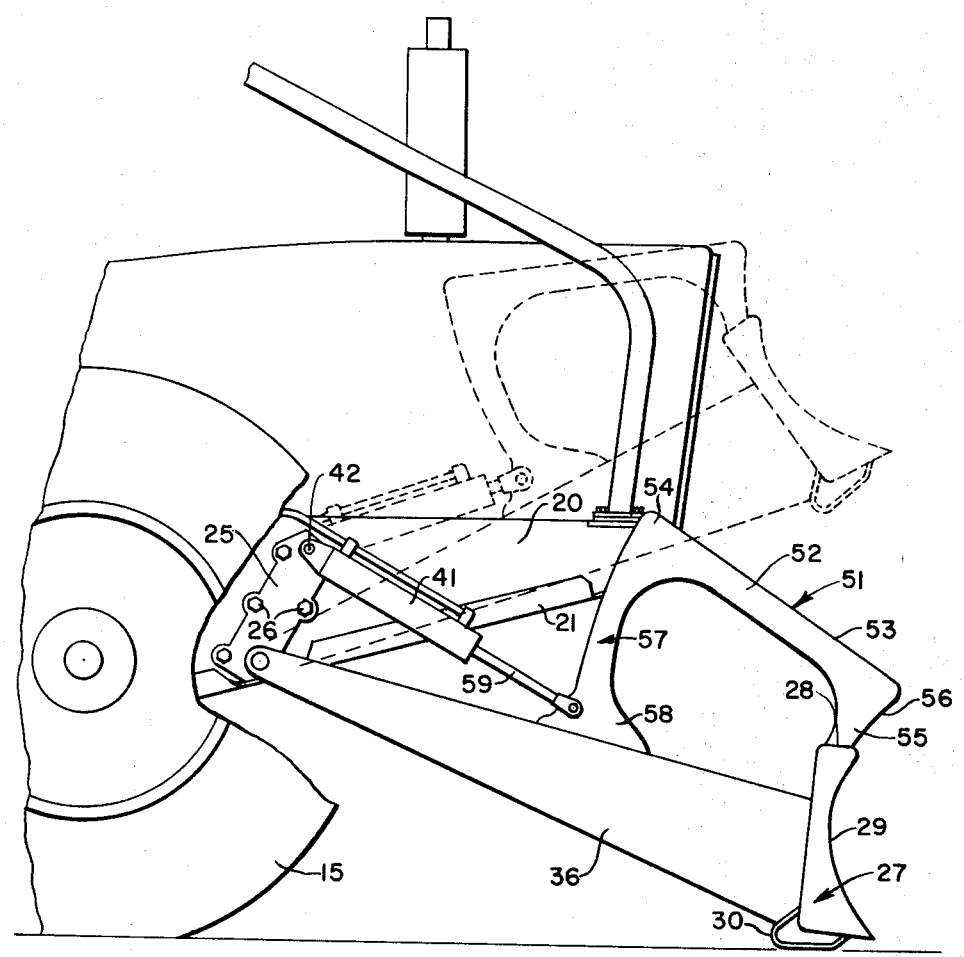
FIG. 3 is an enlarged view of the forward portion of a tractor and blade with the blade being in its lower or down position. The blade and associated lift arms are also shown in their upper positions in dotted representation.

A pair of implement-mounting brackets 25 are bolted at 26 to opposite sides of the U-shaped frame 20. As is clearly evident in FIGS. 1 and 3, the brackets 25 are fixed to the frame 20 comparatively close to the forward end of the tractor. It should also be noted that the area beneath the guard plates 21 is free, other than the guards to be described, of any structure that would prevent trash from entering the area.

The implement to be mounted on the brackets 25 is composed in part of an earth-handling device in the form of a blade 27 disposed, when the implement engages the ground, considerably forwardly of the forward end of the tractor as defined by the forward portion of the U-shaped frame 20 and the rectangular frame 22. Consequently, there is a considerable longitudinal gap between the upper edge 28 of the blade 27 and the nearest forward portion of the tractor. The blade 27 has a forwardly curved blade side 29 and a pair of shoes 30 that ride against the ground when the blade is lowered.

Fixed to and extending rearwardly from the blade are a pair of transversely spaced arms 35, 36 pivotally mounted at 38 to the respective bracket structures 25. It should here be noted that the underside of the tractor body as defined by the guard plates 21 is inclined upwardly and forwardly. Likewise, when the blade 27 is in ground-engaging position, the upper edges of the arms are spaced vertically beneath the guard plates 21 so as to define therewith a vertical gap. As is obvious, the vertical gap between the upper edges of the arm and the guard plate 21 is a longitudinal rearward continuation of the longitudinal gap between the upper edge 28 of the blade 27 and the forward portion of the tractor. Reviewing FIG. 3, it will be noted that as the arms 35, 36 swing vertically, both the longitudinal gap and the vertical gap becomes smaller and the vertical gap between the arms 36 and guard plates 21 completely disappears when the blade 27 is in its uppermost position.

The arms 35, 36 are raised and lowered by a pair of hydraulic cylinders 40, 41 vertically alined with and disposed above the respective arms 35, 36. The rear or cylinder end of the hydraulic cylinders 40, 41 are pivoted to the mounting brackets 25 by pins 42.

A pair of guard structures 50, 51 is provided forwardly of the respective cylinders 40, 41. The structures 50, 51 are in longitudinal forward alinement with the respective cylinders. The guards 50, 51 are identical and each includes an upper portion 52 having an upper inclined edge 53. The upper portion 52 is a barlike section having an upper rear end 54 that lies adjacent the respective side of the tractor and, upon the blade 27 being in ground-engaging position, will be disposed rearwardly of the front end of the tractor and above the underside. From the upper end 54, the edge 53 extends downwardly and forwardly to a portion 55 that connects it to the upper edge 28 of the blade, such connection being by welding or other rigid means. The portion 55 has a front arcuate-shaped edge 56 that extends upwardly and forwardly in substantial upward continuation with the arcuate surface 29 of the blade 27. The forward edge 56 joins with the upper edge 53 at a rounded corner. Due to the shape of the edge 56, the structures 50, 51 operate at their forward ends as hooks to retain and drive material downwardly to the blade.

The structure 51 also includes a rear vertically disposed portion 57 that extends downwardly from the upper end 54 and is rigidly fixed to the upper edge of the respective lift arm. The lower end 58 of the rear portion 57 flairs in a fore-and-aft direction to provide strength to the guard structure 51. Also, the lower end 58 receives the rod end 59 of the respective lift cylinder 40 or 41. As may clearly be seen from viewing FIG. 3, the forward part of the guard structure that includes portions 52, 55 operates to bridge the gap between the forward end of the tractor and the upper edge of the blade 27. Similarly, the rear upright portion 57 bridges the gap between the under portion of the tractor and the upper edges of the lift arms 35, 36. It should also be noted that the portion 52 is spaced above the arms 35, 36 and the rear portion 57 is spaced rearwardly of the blade 27 so that the portions 52, 57 define with the arms 35, 36 and the blade 27 a hollow or opening. This is for the purpose of reducing the weight of the guard structures 50, 51 since they must be heavily constructed for the use they are intended.

In operation, the blade 27 is normally in or close to ground-engaging position. When in the forest, the blade 27 will engage large logs, fallen limbs, underbrush and other such material and at times will tend to drive the material over the upper edge 28 of the blade 27. The guard structures 50, 51 are for the purpose of preventing such material from passing into the gap between the edge 28 and forward end of the tractor body and the gap between the upper edges of the arms 35, 36 and the underside of the tractor. Since the guards 50, 51 have a relatively long longitudinal dimension and also since the upright portion 57 bridges the gap between the edges of the arms 35, 36 and the tractor underside, logs that would tend to be twisted and swung over the upper edge 28 will be prevented from entering into the area between the arms and tractor underside by the portion 57. Thus, the guards generally prevent material entering into the area of the cylinders 40, 41 and also prevent large logs and foreign matter from causing damage to the underside of the tractor when the lift arms are raised.

It should also be noted that by having the upper edges 53 of the guards 50, 51 inclined forwardly and downwardly, material, particularly if it is heavy and bulky, tends to slide down the edges 53 into the path of the blade 27 to eventually be moved off of one end of the blade 27. Also, should large underbrush be accumulated in the area above the edges 53 and forwardly of the tractor front end, the entire accumulation may be moved merely by backing the tractor from the underbrush and driving away from it.

We claim:

1. On an implement-tractor combination in which the tractor has a fore-and-aft body with opposite sides, an underside and front and rear ends, and the implement includes a pair of power operated fore-and-aft extending lift arms pivotally supported for vertical movement on opposite sides of the tractor outwardly of and adjacent the respective sides of the tractor and whereby the arms may be adjusted between upper and lower positions above and below respectively the underside of the tractor, the arms further having forward ends forwardly of the front end of the tractor; and an earth-handling device mounted on the forward ends of the lift arms and extending across the front end of the tractor, the device including a vertically disposed transverse portion with an upper transverse edge positioned spacedly forwardly of the tractor to define therewith a longitudinal gap, the improvement residing in: a pair of upright longitudinal structures supported to move with the arms alongside opposite sides of the tractor with each having front and rear upright portions fixed to the device and arms respectively with the forward portion extending upwardly from the transverse edge and having a forward edge extending in substantial vertical continuation with the vertically disposed transverse portion, and the rear portion extending upwardly from the respective arm and being of sufficient length to bridge the vertical gap between the respective arm and tractor underside when the arms are in their lower position, and a fore-and-aft extending portion joining the front and rear portions for bridging the longitudinal gap between the front end of the tractor and the implement, the fore-and-aft extending portion being inclined when the arms are in their lower position from a lower front end to an upper rear end.

2. On an implement-tractor combination in which the tractor has a fore-and-aft body with opposite sides, an underside and front and rear ends, and the implement includes a pair of power operated fore-and-aft extending lift arms pivotally supported for vertical movement on opposite sides of the tractor outwardly of and adjacent the respective sides of the tractor and whereby the arms may be adjusted between upper and lower positions above and below respectively the underside of the tractor, the arms further having forward ends forwardly of the front end of the tractor; and an earth-handling device mounted on the forward ends of the lift arms and extending across the front end of the tractor, the device including a vertically disposed transverse portion with an upper edge positioned spacedly forwardly of the tractor to define therewith a longitudinal gap, the improvement residing in: a pair of upright longitudinal structures supported to move with the arms alongside opposite sides of the tractor with each having an upper fore-and-aft extending portion bridging the longitudinal gap between the front end of the tractor and the implement when the arms are in their lower positions and with each structure further having a forward portion having a forward edge that extends upwardly and forwardly of the transverse portion of the device and joins with its respective upper portion spacedly above the transverse portion.

3. An implement for use in an implement-tractor combination in which the tractor has a longitudinally extending tractor body with a front end and an underside, the implement comprising a blade extending transversely across and spaced forwardly of the front end of the tractor to define therewith a longitudinal gap and a pair of lift arms rigid with and extending rearwardly from the blade on opposite sides of the tractor body, the arms being pivotally supported on the tractor body to swing vertically from a lower position in which the blade is in ground-engaging position and the arms are below the underside of the tractor body so as to define a vertical gap therewith; extensible and retractable hydraulic cylinders alined vertically with and disposed above the arms and extending between the tractor body and lift arms for raising and lowering the arms; and longitudinally extending guard structures on opposite sides of the tractor body, each of the structures being in forward longitudinal alinement with the respective cylinders and including a vertical rear portion having an upper end rearward of the tractor front end and above the underside when the blade is in ground-engaging position, each rear portion also having a lower end fixed to the respective arm whereby the rear portion shall bridge the vertical gap, the guard structure further having a portion extending forwardly and downwardly from the upper end to a forward end fixed to the upper portion of the blade to thereby bridge the longitudinal gap between the front end and the blade.

4. The structure as set forth in claim 3 further characterized by the hydraulic cylinders being connected to the respective arms at the lower ends of the respective rear portions.

5. An implement for use in an implement-tractor combination in which the tractor has a longitudinally extending tractor body with a front end and an underside, the implement comprising a blade extending transversely across and spaced forwardly of the front end of the tractor to define therewith a longitudinal gap and a pair of lift arms extending rearwardly from the blade on opposite sides of the tractor body, the arms being pivotally supported on the tractor body to swing vertically from a lower position in which the blade is in ground-engaging position and the arms are below the underside of the tractor body so as to define a vertical gap therewith, the latter gap being in a rearward longitudinal continuation with the longitudinal gap; extensible and retractable hydraulic cylinders disposed above the arms and extending between the tractor body and lift arms for raising and lowering the arms; and longitudinally extending guard structures on opposite sides of the tractor body in substantial forward longitudinal alinement with the respective cylinders and including an upper rear end rearward of the tractor front end and above the the underside when the blade is in ground-engaging position and extending forwardly and downwardly from the rear end to a forward end that is integral with a downwardly projecting end portion fixed to the upper portion of the blade to thereby bridge the longitudinal gap between the front end and the blade.

6. On an implement-tractor combination in which the tractor has a fore-and-aft body with opposite sides, an underside and front and rear ends, and the implement includes a pair of power operated fore-and-aft extending lift arms pivotally supported for vertical movement alongside the respective sides of the tractor and whereby the arms may be adjusted between upper positions alongside the tractor and lower positions spacedly below the underside of the tractor to thereby define vertical gaps with the underside, hydraulic cylinders disposed above the arms and extending between the tractor and arms, the arms further having forward ends forwardly of the front end of the tractor; and an earth-handling device mounted on the forward ends of the lift arms and extending across the front end of the tractor, the device including a vertically disposed transverse portion with an upper horizontal edge positioned spacedly forwardly of the tractor to define therewith a longitudinal gap, the improvement residing in: a pair of upright longitudinal structures longitudinally alined with the respective cylinders and supported to move with the arms alongside opposite sides of the tractor with each having an upper fore-and-aft extending portion bridging the longitudinal gap between the front end of the tractor and the implement when the arms are in their lower positions.

7. The structure as set forth in claim 6 in which the upper portions have upper edges that upon the arms being in their lower positions are inclined forwardly and downwardly from upper ends opposite the sides of the front end of the tractor.

8. On an implement-tractor combination in which the tractor has a fore-and-aft body with opposite sides, an underside and front and rear ends, and the implement includes a pair of power operated fore-and-aft extending lift arms pivotally supported for vertical movement on opposite sides of the tractor outwardly of and adjacent the respective sides of the tractor and whereby the arms may be adjusted between upper and lower positions above and below, respectively, the underside of the tractor, the arms further having forward ends forwardly of the front end of the tractor; and an earth-handling device mounted on the forward ends of the lift arms and extending across the front end of the tractor, the device including a vertically disposed transverse portion with an upper horizontal edge positioned spacedly forwardly of the tractor to define therewith a longitudinal gap, the improvement residing in: a pair of upright longitudinal structures supported to move with the arms alongside opposite sides of the tractor with each having an upper fore-and-aft extending portion bridging the longitudinal gap between the front end of the tractor and the implement when the arms are in their lower positions and with each structure further having a rear upright portion that extends downwardly from the rear end of the upper portion to bridge the vertical gap between the respective arm and underside of the tractor when the arms are in their lower positions.

9. The structure as set forth in claim 8 further characterized by the rear portion being rearwardly of the front end of the tractor throughout the movement of the arms between their upper and lower positions.

10. The structure as set forth in claim 8 in which the upper portions of the longitudinal structures are barlike sections spaced above the respective arms, the forward end of each upper portion is rigidly fixed to the transverse portion adjacent its edge and the rear end of each upper portion is fixed to the respective arm by its respective upright portion, and the latter is spaced rearwardly of the transverse portion whereby the upper portion and rear portion form with the respective arm and transverse portion a relatively large opening in the respective longitudinal structure.